Nov. 23, 1971  O. L. PFLIEGER ET AL  3,621,530
MEANS FOR MOLDING CLOSURE CAP GASKETS
Filed June 30, 1969  4 Sheets-Sheet 4
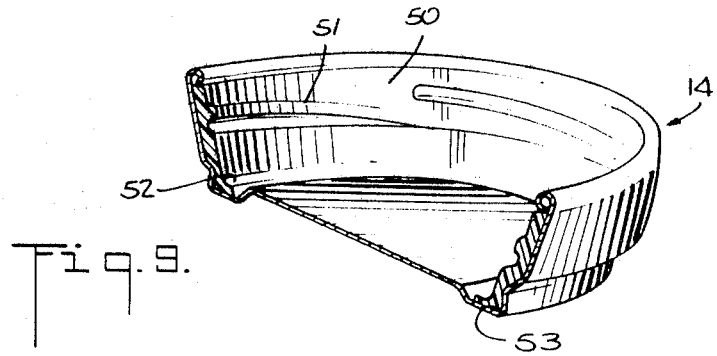
Fig. 9.
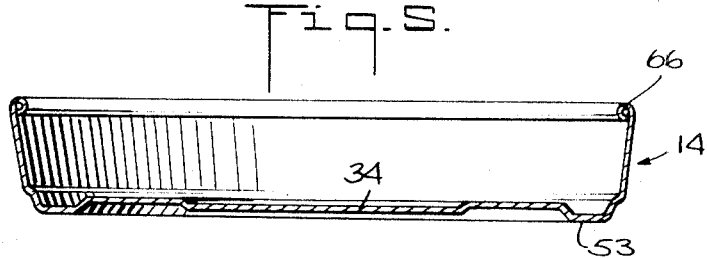
Fig. 5.
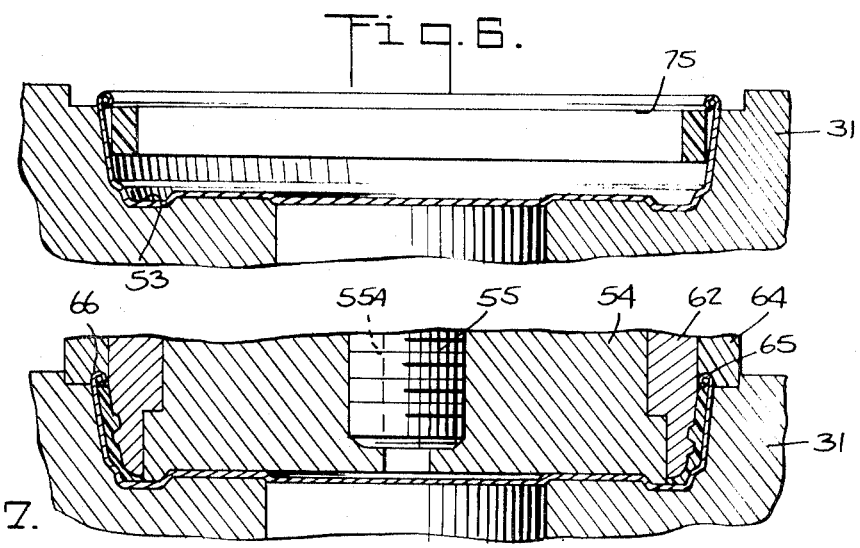
Fig. 6.
Fig. 7.
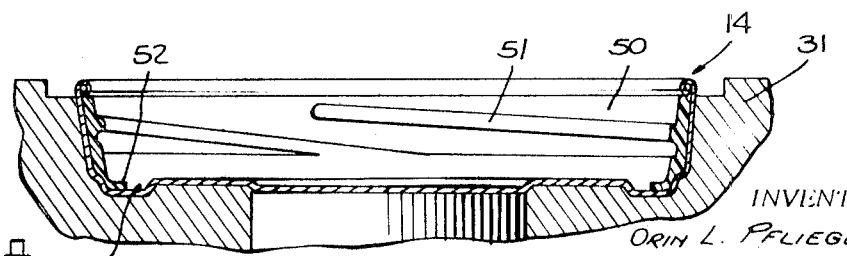
Fig. 8.
INVENTORS
ORIN L. PFLIEGER
BY DANIEL D. ACTON
ATTORNEY

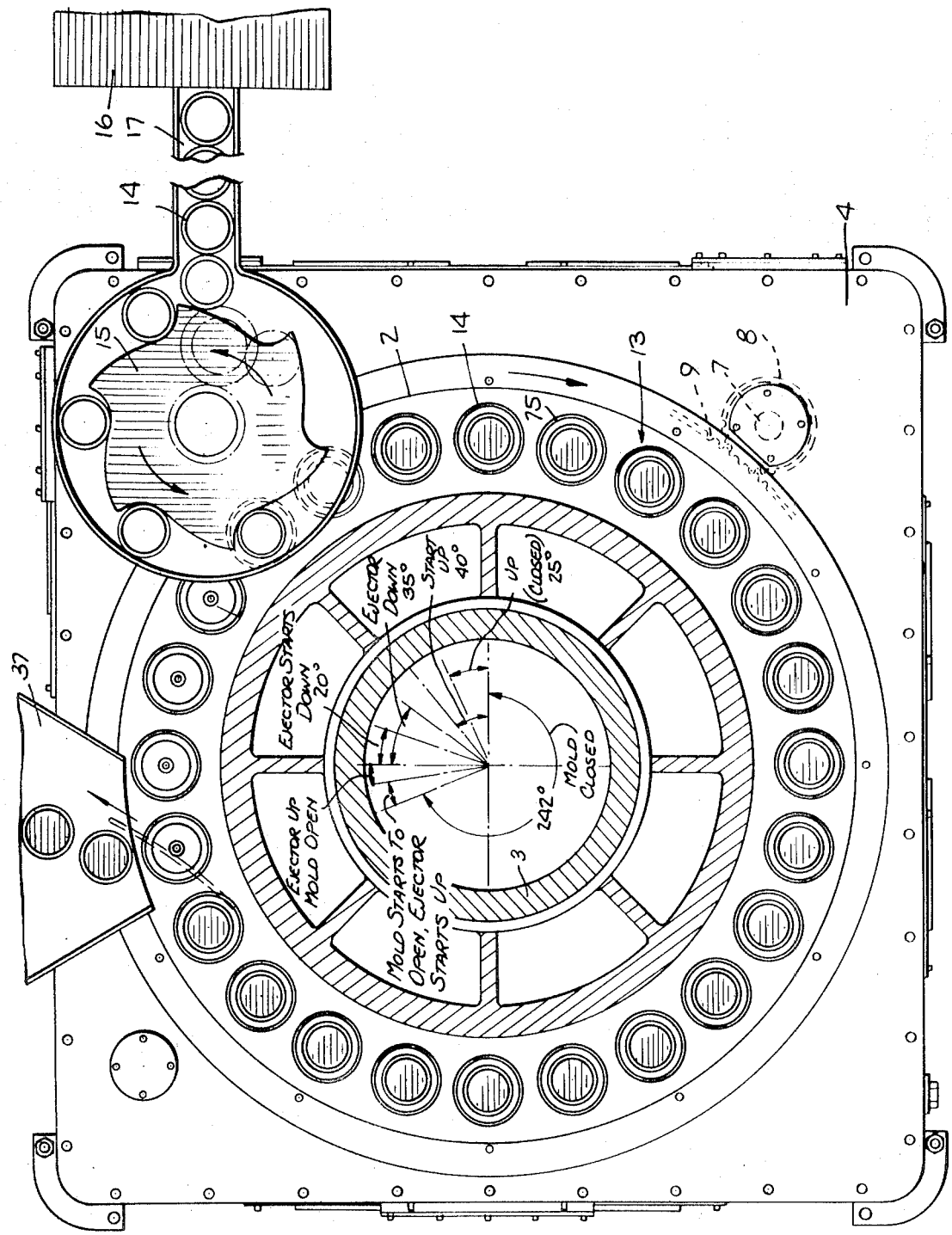

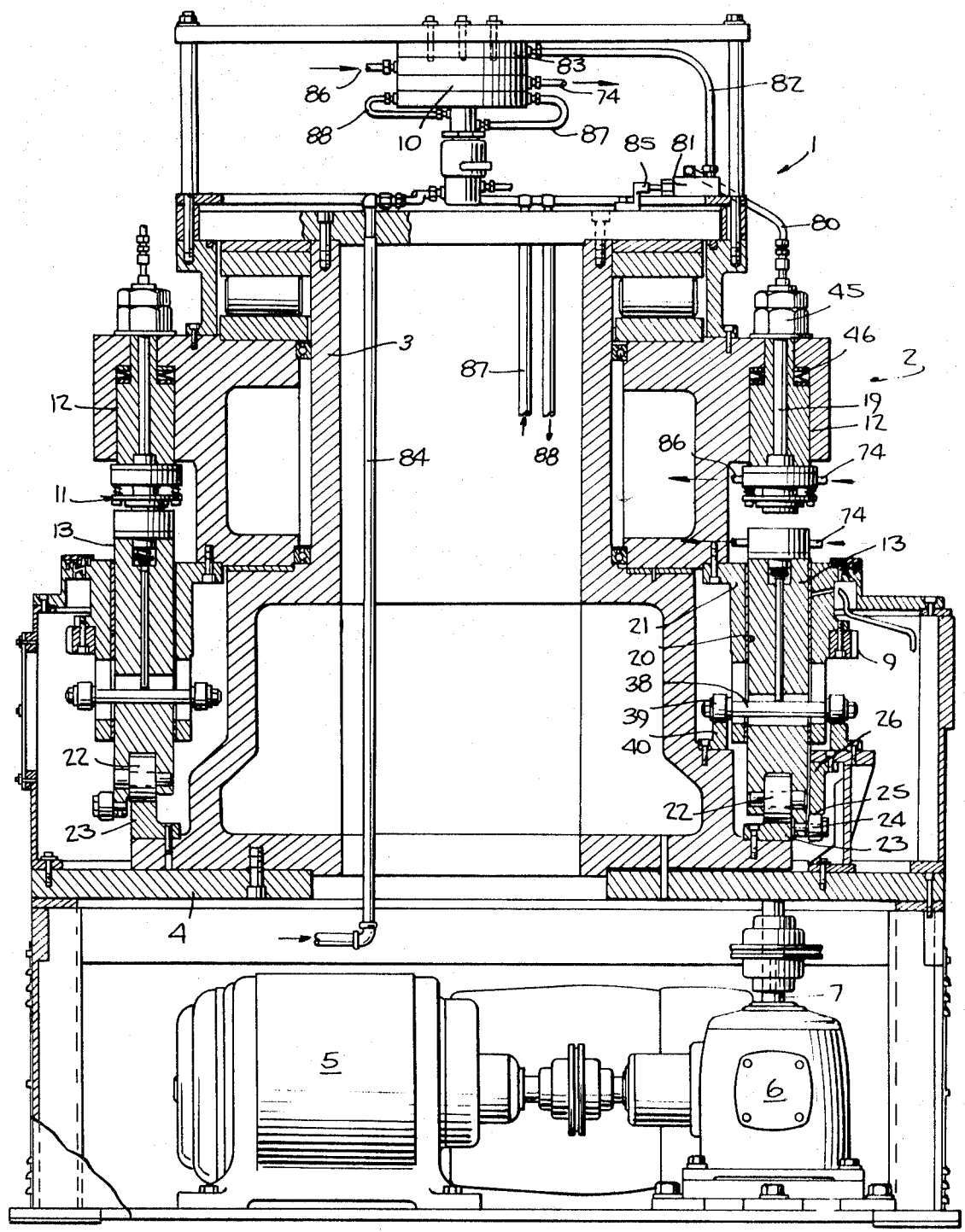

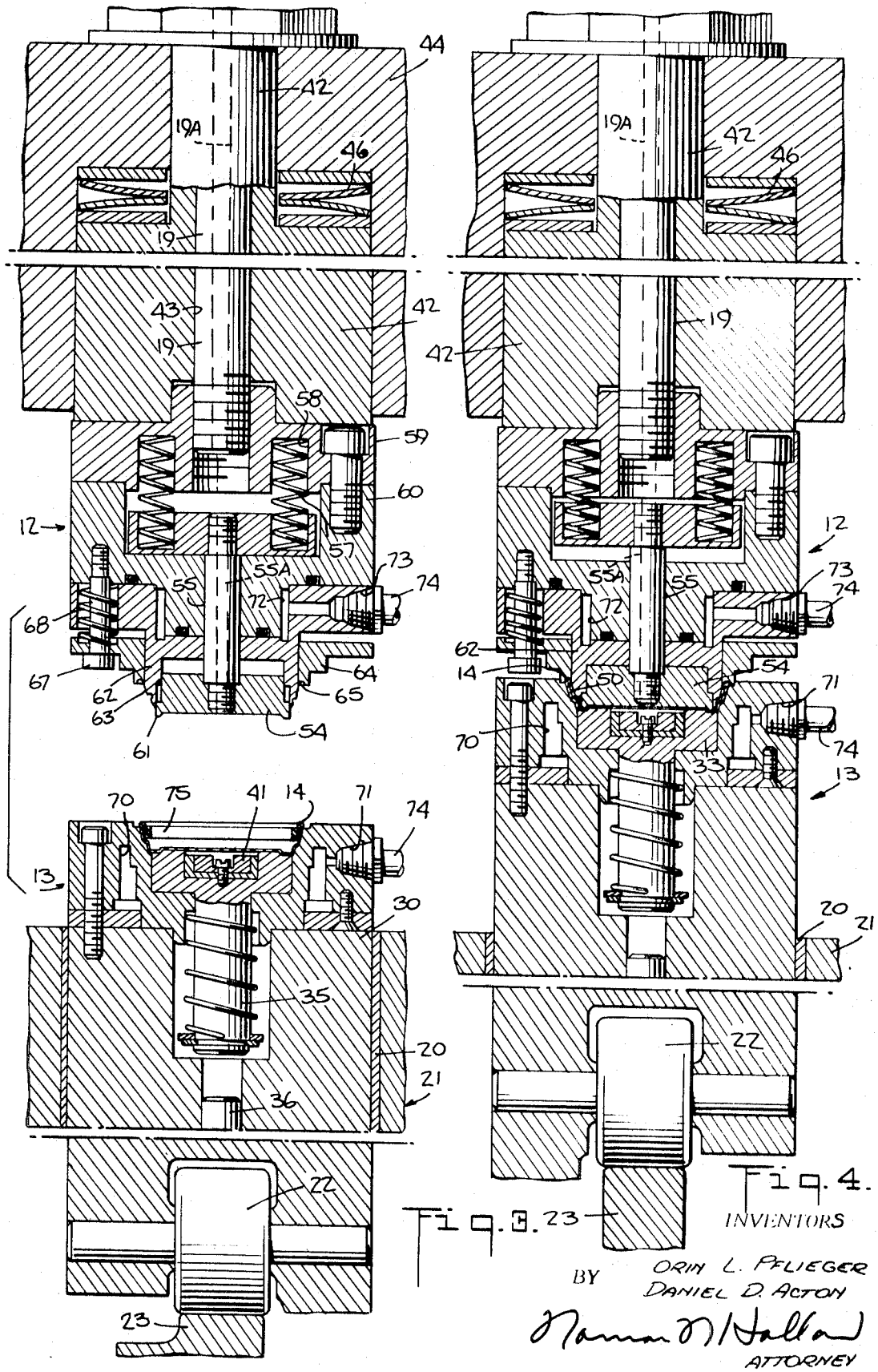

United States Patent Office 3,621,530
Patented Nov. 23, 1971

3,621,530
MEANS FOR MOLDING CLOSURE CAP GASKETS
Orin L. Pflieger and Daniel D. Acton, Lancaster, Ohio, assignors to Anchor Hocking Corporation, Lancaster, Ohio
Filed June 30, 1969, Ser. No. 837,709
Int. Cl. B29c *17/00*
U.S. Cl. 18—5 RR                    6 Claims

ABSTRACT OF THE DISCLOSURE

A machine is disclosed for shaping or molding sealing gaskets within hollow closure cap shells. Closure cap shells having a hollow or cup-like form first have a predetermined amount of gasket material inserted in them either in the form of a cut-ring or as a flowed-in ring. These closure shells are fed into the machine which shapes or molds the gasket material into precisely formed cap gaskets. The machine has a rotating turret mounting a number of molding heads or spindles at its periphery. Each of these heads includes a lower spindle for receiving the closure shells with their hollow gasket receiving interior uppermost. Gasket shaping tools in each head are mounted on an upper spindle. The lower spindle is moved upwardly forcing the closure shell and its included gasket material into engagement with the gasket shaping tools in the upper spindle. The upward movement of the lower spindle is provided by an inclined cam having a slowly rising molding portion which moves the gasket material smoothly and progressively into molding engagement with the upper spindle tools with great force. Adjustable pressure determining members are included in the upper spindle to give a precise control of the final molding force applied by the lower spindle. During the molding operation, the upper and lower spindles are cooled by a circulating temperature controlling fluid which keeps these molds at a relatively low temperature as contrasted with the elevated temperature of the gasket material as has been heated prior to the feeding of the caps into the molding machine.

BACKGROUND OF THE INVENTION

The machine of this invention is utilized for manufacturing closure caps of the type used for sealing containers such as glass and other containers. It is particularly adapted for forming such closure caps where shaped or molded gaskets are used to form the seal between the closure cap and the container. The machine, for example, is especially suited for forming closure caps of the type shown in copending United States patent application Ser. No. 696,654 filed Jan. 9, 1968, now Pat. No. 3,532,247 and owned by the assignee of the present invention where the sealing gasket includes molded container engaging threads which are used to hold the closure cap onto the sealed container.

Prior practice has generally utilized shaped lugs or other thread means on the closure caps formed of the rigid cap shell metal or plastic to removably attach the caps to the containers. It has been found, however, that an improved closure cap results where the container engaging threads as well as the adjacent gasket sealing portions are all molded in a resilient cap liner or gasket.

Such gaskets must be shaped with relatively great precision so that the cap application torque and the cap removal torque can be controlled and additionally so that a tight hermetic seal is formed for the sealed food product.

While known machines have been used for shaping gaskets within closure caps, these prior machines have not provided the necessary combination of precise molding, high speed operation, control of the gasket material volume and high molding force. These prior machines are therefore not suitable for rapid, precise, high pressure gasket molding operations for producing gaskets with threads or other precisely dimensioned zones.

SUMMARY OF THE INVENTION

The new molding machine provides a high speed molding of closure cap gaskets where closure shells including predetermined amounts of gasket material are fed into molding heads mounted at the periphery of a rotating molding turret. The gasket material is first inserted into the hollow preformed metal closure shells. The preferred gasket material, for example, may be precut vinyl chloride rings or the gasket may be flowed-in plastic such as plastisol. In either case, this plastic material has been at least partially cured or fluxed into a relatively hard but moldable state. In a preferred operation, the fluxed gaskets are fed into the molding heads at an elevated temperature to facilitate the molding operation. Each of the molding heads consists of an upper spindle and a movable lower spindle and a number of these heads are mounted at the periphery of the rotating turret. The closure shells are fed onto the lowered bottom spindles as the spindles are moved past a closure feeding device. Thereafter, the turret continues to rotate and the molding heads are closed by a controlled upward movement of the lower spindle preferably by means of an arcuate molding cam. This cam is positioned to engage a lift roller on a lower spindle which moves this spindle and the cap therein upwardly against molding tools on the upper spindle with a high molding force. The molding tools within the upper spindle are positioned to close around the molding material in the cap shell to restrict it to the desired portions of the shells and to shape these portions. The tools may simultaneously form container engaging threads on intermediate portions of the liner. Thereafter, the caps are removed with the finished gaskets formed on the inner edges of the cap skirts.

Accordingly, an object of the present invention is to provide an improved cap manufacturing machine adapted for forming caps with molded closures.

Another object of the present invention is to provide an improved molding machine for closure caps adapted for forming threaded gaskets within the caps.

Another object of the present invention is to provide a cap molding machine adapted for forming threaded gaskets at relatively high speeds.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification wherein:

FIG. 1 is a top plan view partially in section illustrating the path of the closure caps on the molding turret and showing the timing of the molding operation;

FIG. 2 is a vertical sectional view of the molding machine illustrating the molding turret and the molding heads together with the turret drive means;

FIGS. 3 and 4 are enlarged sectional views of the molding heads;

FIG. 5 is a vertical sectional view of a typical closure shell prior to the insertion of the gasket material;

FIG. 6 is a vertical sectional view of a closure cap shell illustrating a cut gasket in position prior to the gasket molding operation;

FIG. 7 is an enlarged sectional view illustrating the closure shell and the gasket during the molding operation;

FIG. 8 is a vertical sectional view illustrating the closure with a completely shaped threaded gasket; and FIG. 9 is an isometric full sectional view illustrating the closure with a completely shaped threaded gasket.

DESCRIPTION OF THE PREFERRED EMBODIMENT

As illustrated in FIGS. 1 and 2, the gasket molding machine 1 of the present invention includes a rotating table or turret 2 mounted for rotation about a stationary center post 3 above an hollow base 4. The base 4 includes a suitable electric drive motor 5 and speed reduction means 6 which are coupled to rotate the turret 2 through the intermediation of shaft 7, gear 8 and ring gear 9. This drive system provides for a continuous rotation of the turret 2 around the stationary center post 3. Mounted above the center post 3 is a multisectional manifold 10 for feeding coolant to the series of spaced molding heads 11 positioned at the periphery of the turret 2.

As will be more fully described below, each of these molding heads 11 comprises a relatively stationary upper spindle 12 mounting the gasket molding tools and a lower spindle 13 which is raised and lowered during turret 2 rotation to apply molding forces to the cap gaskets.

Closure cap shells 14 are fed onto the lower spindles 13 by a feed star wheel 15 which spaces the caps 14 as they are received from the gasket heating oven 16 on the conveyor 17. The feed star wheel 15 is driven in synchronism with the turret 2 by a suitable gear coupling to the turret 2 drive system.

As already indicated, a number of molding heads 11 are mounted on the periphery of the molding turret 2. In the machine illustrated, 24 such heads 11 are illustrated although a greater or lesser number of heads 11 may be used on a machine in accordance with the present invention.

These heads 11 move continuously around a circular path as the turret 2 rotates and as the closure cap feed wheel 15 and cap ejection means 18 successively load and remove the caps 14 from the heads 11 at the spaced feed wheel 15 and ejection means 18 illustrated in FIG. 1.

Each of the molding heads 11 preferably comprises the upper tool holding spindle 12 which is attached to the upper portion of the turret 2 by mounting bolts 19. A slideably mounted lower spindle 13 is mounted in bearings 20 on the lower portion 21 of the turret 2 for vertical movement towards and away from the upper spindles 12. A cam roller 22 is rotatably mounted in the bottom of each of the lower spindles 13 and this cam roller 22 rides on a circular molding cam 23 rigidly fixed to the base 4 of the molding machine 1. The necessary upward movement of the lower spindle 13 for the molding operation, which is more fully described below, is provided by a rising portion on this cam 23 as illustrated at the left side of FIG. 2.

In order to assure the downward movement of spindles 13 or the opening of the spindles 12 and 13 after the closure molding operation, a spindle 13 return roller 24 is rotatably attached to each of the spindles 13 adjacent to the molding cam roller 22 in position to engage the downwardly facing surface 25 of a spindle return cam 26 as illustrated at the right side of FIG. 2.

FIGS. 3 and 4 are detailed sectional views illustrating the spindles 12 and 13 in their open and molding positions respectively.

The lower spindle 13 is seen to include a body portion 30 slideably mounted in the lower portion 21 of the rotating turret 2 in the bearings 20. A closure supporting die or nest 31 is attached to the body portion 30. This has a closure receiving recess 32 shaped to conform to the outer design of the particular closure shell 14 being handled. A slideably contained center ejector portion 33 engages the cover 34 of the closure shell 14 and includes a downwardly depending ejecting pin 35 which is operatively engaged by an ejecting rod 36 for lifting the closure shell 14 so that it may be wiped clear of the lower spindle 13 at the completion of the molding operation. The ejecting rod 36, as seen in FIG. 2, is raised at the appropriate time when the spindle 13 passes the ejector chute 37 (FIG. 1) by a horizontal ejector bar 38 having cam rollers 39 at its opposite ends. The cam rollers 39 engage and are raised by arcuate spaced ejecting cams 40 fixedly mounted on opposite sides of the spindles 13 on a stationary portion of the turret post 3. A magnet 41 is preferably included in the ejector portion 33 to attract the metal closure shells 14 and pull them into position and to hold them in the recess 32 for the molding operation and until the completed closures 14 are wiped clear of the spindles 13 at the ejector chute 37.

Each of the upper spindles 12 includes a body portion 42 with a vertical aperture 43 which contains a mounting bolt 19 attached to the upper rim 44 of the turret 2 by nuts 45. These upper spindles 12 are slideably contained within the turret rim 44 for limited vertical movement and preferably the final molding pressure exerted by the moving lower spindles 13 is set by including several Belleville washers 46 between the body 42 of the spindles 12 and the turret 2. Since the lower spindles 13 are moved a predetermined distance during the molding operation by the molding cam 23, these washers 46 are chosen and positioned and prestressed by the mounting nuts 45 to provide a preset final molding force as the Belleville washers 46 or other springs are compressed by the movement of the upper spindles 12 resulting from the upward movement of the lower spindles 13.

A preferred arrangement of molding tools for a shaped and threaded ring-like gasket 50 is illustrated in FIGS. 3 and 4. Such a gasket, for example, is illustrated in FIGS. 8 and 9 and includes radially inwardly extending threads 51 for engaging a container and also includes annularly sealing portions 52 in a cap top channel 53 and around the threaded portions.

A disc-like cap ejector tool 54 is positioned at the center of the upper spindle 12. This tool 54 is mounted on a sliding rod 55 which is urged downwardly through the intermediation of the threadedly attached spring disc 56 and the compressed coil springs 57 positioned between the disc 56 and annular cavities 58 in the upper portion 59 of the spindle tool holder 60.

The ejector tool 54 is seen to have a downwardly extending relatively narrow flange 61. This flange 61, as seen in FIG. 4, engages the closure cap 14 top adjacent the cap channel 53 and it acts both to center and hold the cap shell 14 in position and also to block off the gasket material when the material is molded by the molding punch 62 positioned outwardly of and in sliding engagement with the ejector tool 54. The spring mounting for the ejector tool 54 is also seen to be useful in forcing the completed closure cap 14 clear of the molding punch 62 when the lower spindle 13 drops clear of the upper spindle 12 at the end of the molding operation.

To further assure the separation of the closure shell 14 with its newly shaped gasket 50 from both the punch 62 and the ejector tool 54, air under pressure is blown against the shell 14 to force it clear of the upper spindle 12. This compressed air is supplied downwardly through the upper spindle 12 through a conduit 19A in the center of bolt 19 and a connecting conduit 55A in rod 55. As illustrated in FIG. 2, the upper end of the conduit 19A is coupled to a source of air under pressure through an air supply system including conduit 80, valve 81, conduit 82 and manifold 10. The upper section 83 of the rotating portion of the manifold 10 provides the air to a similar system for each molding head 11 from a source of compressed air entering upwardly through the central portion of the manifold through an air inlet 84. The valves 81 are cam operated valves moving with the turret which are opened at the time that the lower spindle 13 is being lowered at the termination of the molding cycle to provide the above described puff of cap separating air. A suitably positioned cam 85 is mounted on the stationary upper portion of the turret mounting post 3 to perform this operation at the correct time for each head.

The generally cylindrical molding punch or die 62 is fixedly mounted on the lower portion of the tool holder 60 in a position so that its suitably shaped outer molding surface 63 will engage the plastic material in the closure cap to force it against the cap shell 14 and to shape its inner surface when the lower spindle 13 has been fully raised to its final molding position as illustrated in FIG. 4. A curl support tool 64 is slideably mounted on the outer cylindrical surface of the molding punch 62 and this curl support tool 64 has an appropriately shaped channel 65 in its lower surface which engages the lower edge or curl 66 on the cap shell 14 skirt to block off or to confine the gasket material in its desired position within and below the cap curl 66 during the molding operation by the above described molding punch 62. In order to provide for an effective seating engagement for the curl support tool 64, it is resiliently mounted on the lower portion of the tool holder 60 through the intermediation of the spaced bolt members 67 surrounded by compressed coil springs 68.

In order to provide for the effective molding of the gasket rings and for the retention of their molded form at the completion of the molding operation, it is found desirable to maintain both the cap nest 31 and the molding tools in the upper spindle 12 at a relatively low and substantially constant temperature as, for example, 5 to 10 degrees F. below a normal room temperature in the neighborhood of about 60 to 65 degrees F. where vinyl rings are being used as the gasket material. This temperature will be raised or lowered depending upon the particular gasket material and gasket shape being utilized, however, this temperature is substantially below the temperature of the gasket material itself as it enters the molding machine since the gasket material preferably has been preheated to a temperature from about 200 to 400 degrees F. for most suitable gasket materials to facilitate initial shaping of the gasket material by the molding punch 62. The reduced temperatures for the cap nest 31 and for the tools on spindle 12 are maintained by providing fluid cooling channels within or adjacent to these elements. Such a channel is illustrated at 70 for the cap nest 31 with a water input 71. A similar annular cooling channel 72 is provided adjacent the tools in the upper spindle 12 with a water input 73 which is coupled through the manifold 10, illustrated in FIG. 1, by conduits 74. Water outlet ports (not illustrated) for the channels 70 and 71 return the water to the manifold 10 through conduits 86. Water feed and exhaust systems for the manifold 10 are shown at 87 and 88 respectively.

Operation of the molding machine

The operation of the molding machine 1 will now be described as a cap shell 14 is followed through the machine from the exit of the heating oven 16 to the exit chute 37 of the molding machine 1.

FIG. 1 at the right hand side shows the closure cap shells 14 emerging from the temperature controlled oven 16.

The closure cap shells 14 with the plastic material inserted therein have been passed through this oven 16 to raise the temperature of the plastic material to the desired point for the molding operation. Where cut vinyl rings are being used to form the gaskets, the ambient temperature of the oven 16 will be set to raise the gasket temperatures to about 200 to 400 degrees F. depending upon the precise gasket formulations and final gasket ring thicknesses. The closure shells 14 are now fed one after the other into the molding machine 1 by the rotating star feed wheel 15 which drops one closure shell 14 into a spindle nest 31 for each of the molding heads 11. The continuously rotating molding machine turret 2 now moves the spindle 13 around the circular path and the spindles 12 and 13 then automatically perform the following molding operation.

At the time that the closure shell 14 is dropped or moved into the spindle nest 31, the cap ejector 33 has been lowered as its ejector bar 38 has moved off of the ejector lifting cams 40. The closure shell 14, is, therefore, firmly seated within the molding cavity 32 in the lower spindle 13. As seen in FIG. 1, the cam roller 22 on the spindle 13 is now slowly raised by an upwardly inclined portion of the molding cam 23 to raise the lower spindle 13 towards the molding tools on the upper molding spindle 12. This upward movement will start at about the time that the closure shell 14 has been fully seated in the lower spindle 13 and the molding spindles 12 and 13 will be closed after the turret 2 rotates about 15 to 40 degrees. Thereafter, the molding cam 23 will move the lower spindle 13 in its final molding or closed position for about 240 degrees during further rotation of the turret 2 around the molding machine center post 3.

As the lower spindle 13 is raised, the ejector tool 54 will first engage the closure cap top 34 radially inwardly of the cut gasket ring 75 or other gasket material to simultaneously hold the closure shell 14 down and to provide a circular barrier to limit the radially inward movement of the gasket material 75. Substantially simultaneously with this action, the curl support tool 64 will engage the curled edge 66 of the closure cap shell 14 to further hold the closure shell 14 in place and to form an outer barrier to define the limit of movement of the gasket material along the closure shell 14 skirt. Both the ejector tool 54 and the curl support tool 64 move upwardly against the force of the coil springs 57 and 68 against upper stops as the centrally located molding punch or die engages 62 and shapes the heated and gasket material to mold it into the desired gasket shape.

During the mold closing action or upward movement of the lower spindle 13, and after the ejector 54 and curl supports 64 reach their uppermost or stop position, the final molding pressure or force applied by the molding punch 62 will be determined by the compression of the Belleville washers 46 positioned above the movably mounted upper spindle 12. As already indicated, these washers 46 are chosen and positioned so that a predetermined upward movement of the upper spindle 12 will result in a predetermined spring force and thus molding force at a molding tool 62.

As also described earlier, a continuous supply of coolant is preferably run through tools 62 and 31 on the upper and lower spindles 12 and 13 respectively to maintain them at a substantially constant and relatively low temperature substantially below that of the gasket material being fed into the machine in the closure shells 14. This coolant will continue to flow through the spindles during the above described molding action.

After the molding action and as the spindle moves to within about 80° of its original closure feed position, the spindles are opened by a downwardly sloping portion of the molding cam 23 and the above described air puffing system including valve 81 releases the closure shell 14 from the tools of the upper spindle 12. The ejector bar cam rollers 39 now engage the ejecting cams 40 to lift the molded closure 14 clear of the cap nest 31 to hold it in an elevated position so that it may be wiped or otherwise diverted into the exit chute 37. This ejection action may take place over a relatively short portion of the spindle path and the ejector 33 is then lowered some 35° in advance of the spindle cap shell loading position to assure that the spindle nest 31 is clear and ready for the next molding cycle.

A temporary holder may be used in place of the regular metal closure shell where the molded plastic material is to comprise a rigid portion of a closure cap. In this case the temporary holder acts as a support and partial die for the molded material and it is stripped from the molded plastic cap or cap portion after the molding operation.

It will be seen that an improved high speed automatic cap forming machine has been provided wherein plastic-like liners or gaskets are molded to precise dimensions within a hollow metal or other closure shell. The molding machine is particularly adapted for forming such molded gaskets for thermosetting and thermoplastic gasket materials with relatively intricate shapes including gaskets which have container engaging threads precisely positioned in or near the container sealing surfaces.

In particular a molding machine of this type has been provided which is capable of applying extremely large molding forces to the gasket material to assure precise shaping and shape retention. In addition to providing relatively great shaping forces the machine also provides for a gradual or controlled application of these forces and includes means for adjusting the final molding pressures or forces and temperatures to obtain the best results for the particular gasket material being used including thermosetting and thermoplastic materials as well as relatively hard gasket materials such as fully cured or partially cured precut vinyl rings or the like.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a rotary molding machine for forming shaped gaskets of fully cured warm plastisol in cup-shaped closure shells with said machine having a base and a turret mounted for rotation about a vertical axis on said base and having a plurality of molding heads mounted in spaced relation at the edge of said turret, the improvement comprising said heads each comprising a lower spindle having a closure shell support with a recessed closure shell receiving nest and an upper spindle mounting gasket shaping tools positioned for entering said closure shell, means mounting said lower spindles for movement towards and away from said upper spindles, rigid drive means for said lower spindles for rigidly driving said spindles a predetermined distance comprising cam followers positioned to engage an elongated arcuate cam with an inclined camming surface and mounted on said base, mounting means for said upper spindles providing for their upward movement on said turret, resilient means for controlling the said upward movement for adjustably predetermining the final molding forces exerted between said spindles, means for cooling said spindles comprising a circular fluid channel positioned immediately adjacent to and surrounding each of said nests in the lower spindles and a circular fluid channel positioned immediately adjacent to and surrounding each of said tools, and means for circulating cooling fluid through said chambers for maintaining the temperature of the nests and tools at about room temperature while the warm plastisol is formed under the said predetermined molding forces.

2. The molding machine as claimed in claim 1 in which said tools comprise a first tool for blocking the flow of gasket material radially inwardly of the closure shell, a second tool for blocking the flow of gasket material outwardly of the closure shell, and a third gasket molding tool positioned between said first and second tools including a radially outwardly directed molding surface.

3. The molding machine as claimed in claim 1 which further comprises said resilient means for resiliently mounting the upper spindles comprising Belleville washers.

4. The molding machine as claimed in claim 1 in which said rigid drive means comprises a unitary rigid member slidably mounted on said base and mounting one of said cam followers on its bottom and having one of said closure shell supports attached directly to its top.

5. The molding machine as claimed in claim 1 in which said closure support includes a slidably mounted ejector portion including a magnet.

6. The molding machine as claimed in claim 5 which further comprises a lift means for said ejector portion including stationary cam on said machine base, a cam follower positioned on said lower spindle, and a rod operatively connecting said cam follower and said ejector portion.

References Cited
UNITED STATES PATENTS

| | | | |
|---|---|---|---|
| 3,135,019 | 6/1964 | Aichele | 18—5 D |
| 3,366,723 | 1/1968 | Green | 18—5 RR X |
| 3,407,442 | 10/1968 | Wright | 18—5 RR X |
| 3,159,701 | 12/1964 | Herter | 18—2 RA X |
| 3,137,038 | 6/1964 | Maynard | 18—2 RA X |
| 3,004,297 | 10/1961 | Stover | 264—163 |
| 3,924,848 | 2/1960 | Stover | 18—5 |
| 2,663,908 | 12/1953 | Maier et al. | 264—268 |
| 2,745,135 | 5/1956 | Gora | 264—153 |

THERON E. CONDON, Primary Examiner

H. M. CULVER, Assistant Examiner

U.S. Cl. X.R.

18—DIG 6